United States Patent [19]

Koning

[11] Patent Number: 4,969,726
[45] Date of Patent: Nov. 13, 1990

[54] RING LASER GYRO PATH-LENGTH-CONTROL MECHANISM

[75] Inventor: Menno Koning, Dover, Mass.

[73] Assignee: Northrop Corporation, Los Angeles, Calif.

[21] Appl. No.: 740,557

[22] Filed: Jun. 3, 1985

[51] Int. Cl.$^5$ .................... G02B 7/18; G02B 5/08; H01S 3/08
[52] U.S. Cl. ............................ 350/632; 350/607; 350/611; 350/631; 350/633; 350/637; 372/107
[58] Field of Search ............... 350/607, 611, 631, 632, 350/633, 637; 372/94, 107; 356/350

[56] References Cited

U.S. PATENT DOCUMENTS

| | | | |
|---|---|---|---|
| 3,404,352 | 10/1968 | Bowness | 350/633 |
| 4,113,387 | 9/1978 | Shutt | 372/107 X |
| 4,318,023 | 3/1982 | O'Neill et al. | 310/328 |
| 4,386,853 | 6/1983 | Ljung | 372/94 X |

FOREIGN PATENT DOCUMENTS

| | | |
|---|---|---|
| 0094635 | 5/1983 | European Pat. Off. . |
| 3218528 | 11/1983 | Fed. Rep. of Germany . |
| 3218576 | 11/1983 | Fed. Rep. of Germany . |

OTHER PUBLICATIONS

R. Baumann, "Discussion of the Beam Geometry in a Ring Laser Gyro in Relation to Its Performance", Honeywell GmbH Paper, Germany, pp. 1-38.

Primary Examiner—Stephen C. Buczinski
Attorney, Agent, or Firm—Terry J. Anderson; Robert B. Block

[57] ABSTRACT

Piezoelectric discs are mounted within conical members, one of which is contact with a mirror. Electrodes are applied across the piezoelectric discs. Voltage applied to the electrodes cause the diameter of the disc to contract deforming the conical members and moving the mirror. The conical members provide mechanical amplification resulting in mirror movements to control the path length in a ring laser gyroscope.

6 Claims, 2 Drawing Sheets

RING LASER GYRO PATH-LENGTH-CONTROL MECHANISM

BACKGROUND OF THE INVENTION

This invention relates to ring laser gyro path length control mechanisms and more particularly to such a mechanism employing the diametrical contraction of piezoelectric discs to effect mirror motion.

The optical path length in a ring laser gyro must be accurately controlled to insure acceptable gyro performance. Path length is commonly controlled utilizing piezoelectric devices which adjust the location of a movable mirror in the ring laser gyro cavity. In known configurations, piezoelectric discs are stacked and mirror motion is effected by changes in the thickness of the piezoelectric discs. When a voltage is applied to such as disc, its thickness increases. The magnitude and polarity of the voltage applied to such discs is derived from the laser output to maintain optimum laser gain and frequency. The path length control mechanism is required to compensate for dimensional changes in the ring laser gyro block and mirrors due, for example, to temperature variations or instabilities in the materials. In a typical application, the maximum distance over which the mirror must be adjusted is about 100 micro-inches. The required accuracy and resolution of mirror motion is typically less than 1 micro-inch.

As the mirror moves to control path length, it is necessary that the plane formed by the laser beams remain essentially invariant in its location with respect to the reflective surfaces of the mirror, the aperture in the path of the laser beams, and the laser electrodes because any change in the location of this plane will also affect the laser gain and the laser bias conditions. Deformation of the laser block due to accelerations or thermal variation in a direction transverse to the laser plane will cause relative displacement of the plane. In small ring laser gyros, for instance, with a total path of less than 15 inches, the laser block can be made rigid enough to prevent excessive dislocation of the laser plane due to block distortions. In this case, the major cause of variations in the laser plane is the inability of the piezoelectric path length control mechanism to accurately displace the mirror only in the plane of the laser beams. Non-uniform conditions of the piezoelectric elements and inaccuracies in the dimensions of the fabricated parts of the mechanism cause the mirror to tilt when it is moved to adjust the path length and this tilt causes the location of the laser plane to change.

It is therefore an object of the present invention to provide precise path length control in a ring laser gyro while minimizing mirror tilt.

Yet another object of the invention is such path length control which has a simple mechanical configuration.

SUMMARY OF THE INVENTION

These and other objects of the invention are achieved by means of a path length control mechanism including piezoelectric discs. The discs are mounted within conical members one of which is attached ot the center of a mirror diaphragm and the other of which is attached to an outside or reference surface of the mirror. Electrodes are attached across the piezoelectric discs. When a voltage is applied to the discs, the diameter of the discs will contract. The contraction of the discs is transformed into a desired linear motion, with mechanical amplification; by deformation of the conical members. In this way, the center of the mirror is pulled in a straight line in the plane of the laser beams against the stiffness of the mirror diaphragm resulting in mirror motion without tilt.

BRIEF DESCRIPTION OF THE DRAWING

The invention disclosed herein will be understood better with reference to the drawing of which.

DESCRIPTION OF THE PREFERRED EMBODIMENT

Figure 1:
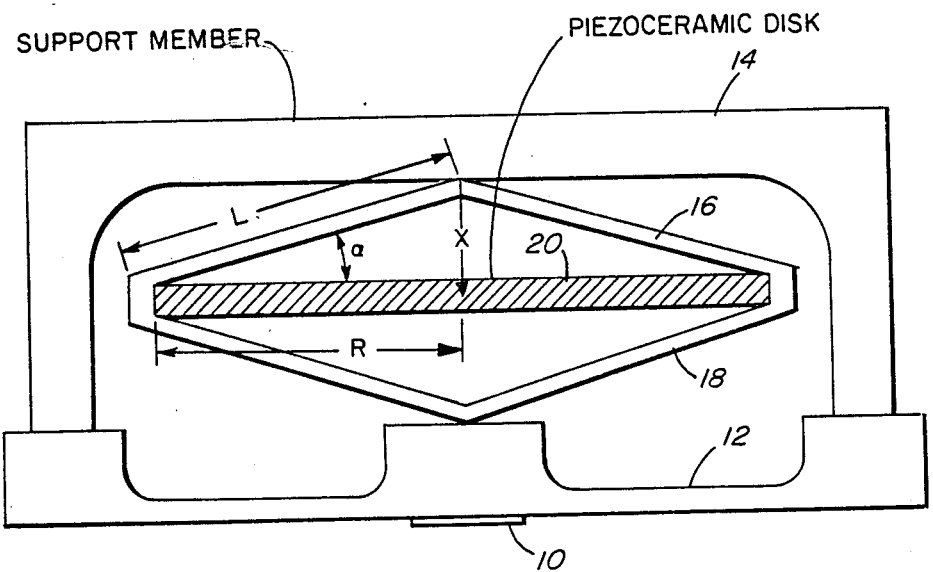
FIG. 1 is a schematic diagram of the invention illustrating the principles of operation.

The principles on which the present invention is based will first be discussed in conjunction with FIG. 1. As discussed above, path length in a ring laser gyro is controlled by the location of a mirror surface such as a mirror surface 10. As will be understood by those skilled in the art, the mirror surface 10 would be included in a ring laser gyro cavity (not shown) to adjust path length. The mirror surface 10 forms part of a mirror diaphragm 12. The mirror diaphragm 12 is rigidly affixed to a support member 14. Included within the support member 14 are an upper conical member 16 and a lower conical member 18. Disposed between the conical members is a piezoelectric or piezoceramic disc 20. A suitable piezoceramic disc is made of lead zirconate titanate having a diameter of 0.7 inches and a thickness of 0.02 inches. Such a disc will contract diametrically approximately 200 micro-inches when a voltage of 500 volts is applied across the thickness of the disc. It will be recognized that contraction of the disc 20 results in an amplified displacement of the mirror surface 10 along the direction denoted as X. In particular, for a disc having a radius R and the conical members 16 and 18 having a section of length L, then $dX/dR = R/\sqrt{L^2 - R^2}$ since $X = \sqrt{L^2 - R^2}$. It will be recognized that the amplification dX/dR approaches infinity as the angle $\alpha$ approaches zero. For practical reasons of part tolerancing and limits of material stress, $\alpha$ is selected to be approximately 10°. In a typical application in which R=0.35 inches and L=0.3554 inches, the amplification dX/dR is 5.7. That is, changes in the dimension X will be approximately 5.7 times changes in the dimension R. This mechanical amplification results from the geometrical configuration. Furthermore, the configuration is less susceptible to error resulting from transverse accelerations and the mirror moves in a highly repeatable manner. In the theoretical case of perfect fits between parts and infinitely stiff members, the mirror displacement, upon the application of 500 volts across the disc 20, would be 1140 micro-inches or 2.28 micro-inches per volt. The relationship between voltage applied and motion of the mirror surface 10 is substantially linear and repeatable. The mechanical amplification also lowers the necessary voltage across the disc for satisfactory operation.

Figure 2:
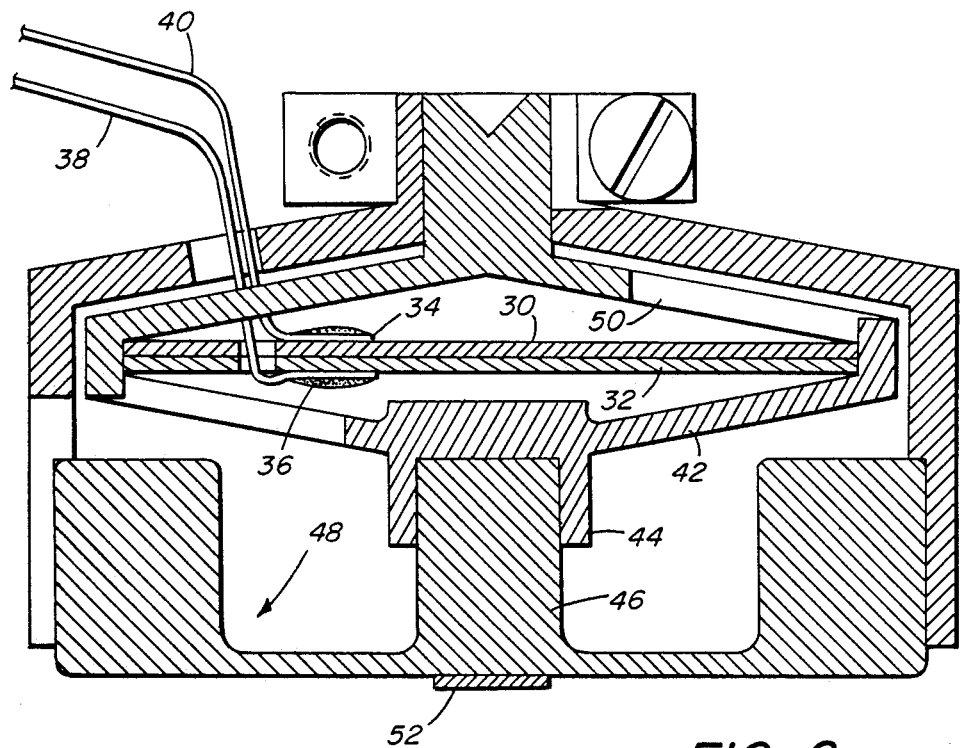
FIG. 2 is a preferred embodiment of the present invention.

In the embodiment of FIG. 2, a pair of piezoceramic discs 30 and 32 are employed. Electrodes 34 and 36 are affixed to the discs 30 and 32 respectively. Leads 38 and 40 allow voltages to be applied across the discs 30 and 32. In this embodiment a lower conical member 42 includes a portion 44 adapted to be attached to a protrusion 46 of the mirror assembly 48. The discs 30 and 32 are assembled into the conical members 42 and 50 with a preload, which is accomplished by pressing on the centers of the conical members 42 and 50 as the discs are inserted. The preload assures a good slip free fit between the parts. During final assembly, the conical member 42 is preloaded against the mirror portion 46 by a predetermined amount.

In operation, when it is desired to alter the location of a mirror surface 52 to adjust the path length in a ring laser gyro, a voltage is applied across the electrodes 34 and 36. As discussed above, such voltage will cause the piezoceramic discs 30 and 32 to contract diametrically. Because of the geometrical configuration resulting in mechanical amplification, this diametrical contraction moves the mirror surface 52.

The inaccuracies inherent in a piezoceramic part are of little concern in this embodiment since the conical members 42 and 50 adapt to the outside rim of the ceramic disc as a result of the preload and interference fit. Furthermore, thermal expansion of the disc is automatically compensated for and there is no need to carefully match ceramic parts with other parts of the structure. The present design approaches the ideal condition of applying forces between the center of the mirror and a fixed point on the support member in a repeatable manner. This arrangement results in motion of the mirror surface 52 with virtually no tilt whatsoever. Unlike previous piezoelectric assemblies, the present assembly is relatively insensitive to disturbances due to vibrations, accelerations and shock since there is little overhang and the movable parts are supported by rigid members. In particular, the conical members 42 and 50 are selected to be stiff enough to assure high natural frequencies.

It is thus seen that the objects of this invention have been achieved in that there has been disclosed apparatus for precisely moving a mirror surface without accompanying tilt. The disclosed apparatus provides mechanical amplification and mirror motion is highly repeatable.

It is recognized that modifications and variations of the present invention will occur to those skilled in the art and it is intended that all such modifications and variations fall within the scope of the appended claims.

What is claimed is:

1. Apparatus for controlling location of a mirror, comprising:
    a support member affixed to the periphery of the mirror;
    a pair of conical members disposed within the support member, one of the conical members affixed to a central portion of the mirror and the other conical member affixed to the support member;
    piezoelectric disc means diametrically engaging the conical members; and
    means to apply a voltage across the disc means whereby diametrical contraction of the disc means results in linear motion of the surface of the mirror.

2. The apparatus of claim 1 wherein the disc means includes a pair of piezoceramic discs.

3. The apparatus of claim 2 wherein the piezoceramic discs are made of lead zirconate titanate.

4. The apparatus of claim 1 wherein the means for applying a voltage across the disc means includes electrodes affixed across the disc means.

5. Apparatus for controlling the location of a mirror structure, comprising
    a support member having an edge defining a generally concave shape, and further engaging a periphery of the mirror structure,
    a first partially flexible generally conical element having an apex engaging the support member and a base portion oriented generally towards the mirror structure.
    a second partially flexible generally conical element having an apex engaging the mirror structure and a base portion oriented generally towards the support member and engaging the base portion of the first conical element, and
    a piezoelectric element having a generally circular configuration with a rim of the piezoelectric element engaging the first and second conical element base portions, wherein variations in the diameter of the piezoelectric element displace the mirror structure.

6. The apparatus of claim 5 wherein the first and second conical elements are disposed between the support member and the mirror structure in a partially compressed preloaded condition.

* * * * *